United States Patent [19]

Blanchard

[11] Patent Number: 4,812,713
[45] Date of Patent: Mar. 14, 1989

[54] AUTOMATIC CLOSED LOOP SCALING AND DRIFT CORRECTING SYSTEM AND METHOD

[76] Inventor: Clark E. Blanchard, 1396 Mapleview SE., Kentwood, Mich. 49508

[21] Appl. No.: 858,414

[22] Filed: May 1, 1986

[51] Int. Cl.[4] .................. H01J 29/56; H04N 9/24
[52] U.S. Cl. .................... 315/370; 358/67; 358/69
[58] Field of Search ................ 315/370, 10; 358/67, 358/69, 109, 103; 340/705, 980; 350/174; 342/409

[56] References Cited

U.S. PATENT DOCUMENTS

| | | | |
|---|---|---|---|
| 3,536,823 | 10/1970 | Goode et al. | 358/67 |
| 3,710,018 | 1/1973 | Ryley et al. | |
| 3,730,984 | 5/1973 | Smith | |
| 3,939,486 | 2/1976 | Tomii | 358/67 |
| 4,159,484 | 6/1979 | Strathman | 358/67 |
| 4,167,113 | 9/1979 | Mann | |
| 4,400,731 | 8/1983 | Brown | |
| 4,485,394 | 11/1984 | Ghaem-Maghami et al. | |
| 4,533,091 | 11/1985 | Bristol | |
| 4,560,233 | 12/1985 | Banbury | |
| 4,593,308 | 6/1986 | Kemplin | |
| 4,625,153 | 11/1986 | Micic et al. | 315/370 |
| 4,630,115 | 12/1986 | Hilsum | |
| 4,632,508 | 12/1986 | Connelly | |
| 4,636,843 | 1/1987 | Hosono et al. | 315/370 |
| 4,647,967 | 3/1987 | Kirschner et al. | |
| 4,677,340 | 6/1987 | Miller et al. | 358/69 |
| 4,683,467 | 7/1987 | Macaulay et al. | |

FOREIGN PATENT DOCUMENTS

2156634 10/1985 United Kingdom ............... 315/370

Primary Examiner—Theodore M. Blum
Assistant Examiner—David Cain

[57] ABSTRACT

Reference beam deflection command values are assigned to respective pinholes at two diametrically opposite corners of a cathode ray screen. The pinholes sense actual beam position by transmitting light via respective fiberoptic cables to a detector arrangement remote from the electrostatic fields at the screen. Command values corresponding to actual beam alignment with the pinholes are determined and compared to the preselected reference beam deflection values, to produce corrections required to compensate for image scaling and/or center drift errors. With stroke type image generation, special beam search patterns are generated in the vicinity of the pinholes to activate the detector arrangement.

31 Claims, 2 Drawing Sheets

AUTOMATIC CLOSED LOOP SCALING AND DRIFT CORRECTING SYSTEM AND METHOD

BACKGROUND OF THE INVENTION

Certain applications of cathode ray tube (CRT) displays require highly accurate and reliable beam positioning with absolute registration. An example of this requirement exists for aircraft Head Up Displays (HUD). A HUD requires that certain CRT generated symbols be projected optically against the pilot's outside view of the real world, with accurate absolute registration. This accuracy must be maintained over production variation, environmental conditions, and over the life of the equipment. Present methods generally rely on use of high quality, expensive, low drift analog designs and components. In addition, periodic maintenance testing and calibration are also employed. Internal circuit monitoring is usually limited to a general test of the deflection amplifiers output with a known sample input. A much more desirable situation would involve monitoring the entire analog circuit path which controls the CRT beam position. A most ideal situation would be to drive the beam in a closed loop manner somewhat like a servo-mechanism.

Over a period of more than two decades, the military have proven the value of the HUD concept. All new generation fighter aircraft are equipped with HUD as standard issue. A major reason that the concept has been slow to penetrate the civil sector is cost. It is considered that the potential market in civil aviation for a cost effective HUD system has been substantial for a considerable number of years.

SUMMARY OF THE INVENTION

It is therefore a principal object of the present invention to provide an aircraft head up display system which may be implemented and maintained in a relatively economical manner so as to be suited to use in business and commercial aircraft, while yet providing a high degree of reliability over the life of the equipment.

A further object of the invention resides in the provision of a real time display system and method wherein beam deflection is periodically monitored, and registration errors are automatically corrected without detriment to the continuous display of real time information, for example, such as required by a pilot during landing of an aircraft.

It is also an object of the invention to provide a display system and method adaptable to aircraft head up display equipment and similar applications requiring highly accurate and reliable beam positioning with essentially absolute registration, wherein components with less stringent tolerance specifications may be utilized, and wherein the operational status of the display system may be automatically monitored while the equipment is in use for its intended purpose.

Another object of the invention is to provide a display system and method applicable either to a raster type display or to a stroke generating type display and which will automatically maintain a desired image scaling relationship and/or image centering in spite of environmental variations, component aging effects, and the like.

A feature of a preferred form of the invention resides in the provision of an aircraft head up display system wherein errors in image scaling and/or centering can be detected without detriment to an apparently continuous real time display in the pilot's field of view, and wherein errors are corrected by compensating the individual beam deflection commands as generated by the HUD digital computer system itself (without reliance on the supply of separate gain and/or drift correction signals to the deflection amplifiers), so as to provide a system of increased simplicity, economy and reliability.

A further feature of preferred embodiments of the invention involves the optical transmission of beam position light pulses generated at the image display screen to photoelectric transducer means located remotely from the fluctuating electrostatic fields of the image display tube, so as to enable the use of simple pulse sensitive electronic circuitry for detecting beam alignment with known points on the image display screen.

In a preferred implementation of the present invention the exact deflection command signals required to position the beam at known locations are determined. If two known locations are used, both the drift (centering) and scaling errors in the deflection control can be directly determined and subsequently compensated. This concept will hold true for both raster and stroke formats. Detection of the beam at the chosen known locations is facilitated with photodetectors. In a raster type format, each photodetector will provide a pulse output when the beam is positioned at an associated beam sensing location. At this time the values of the horizontal and vertical deflection commands are stored. These values for each detector are then compared to baseline reference values, thereby obtaining a measure of the correction (or deviation) required to offset the effects of drift and/or scaling errors present in the system. Subsequently, these correction values can be used to compensate the main deflection control, thereby achieving accurate absolute registration of the CRT video image positioning. Implementation in a stroke type CRT format requires a slightly different technique because the beam does not periodically traverse the entire CRT face area. In a stroke CRT application, normal symbol generation may be periodically interrupted for a negligible time interval for testing beam registration. During a test, the beam is driven in a search pattern in the known vicinity of a photodetector location. When the detector senses the beam at its location, it will signal the test control. The test control will store the instantaneous horizontal and vertical deflection command values. These values for each detector are then compared to baseline reference values, thereby obtaining a measure of the correction required just as in the case for the raster CRT. The test at respective detector locations can be performed in respective sequential intervals between normal symbol generation frames if required. The registration testing time intervals are kept short enough to be transparent to the human observer. The photosensors are coupled with beam sensing locations near the CRT outer face edge to avoid obstruction of the display. The use of two photodetectors is sufficient to allow logical determination of both drift (centering) and gain errors in the deflection system.

The advantages of a preferred implementation of the present invention include the following:

(1) Allows relaxation of critical deflection design parameters and of periodic maintenance schedules, with attendant economies.

(2) Simplicity of the required hardware.

(3) Provides correction based on testing of the entire beam control path so as to compensate for the effect of many specific error sources.

(4) Corrects for both drift (centering) and scaling errors.

(5) Monitors an essentially analog path digitally.

(6) Can be extended to determine long term trends in degradation for preventative maintenance.

(7) Automatic—does not require manual involvement.

(8) Does not require precision voltage or precision time base.

(9) Distinguishes between a correctable error and a gross malfunction.

A preferred embodiment of the invention has been reduced to practice and is now operative in a head up display system which is commercially available from Jet Electronics and Technology, Inc. of Grand Rapids, Mich.

Other objects, features and advantages of the present disclosure will be apparent from the following detailed description taken in connection with the accompanying sheets of drawings, and from the respective claims appended hereto.

DESCRIPTION OF FIGS 1-5.

Figure 1:
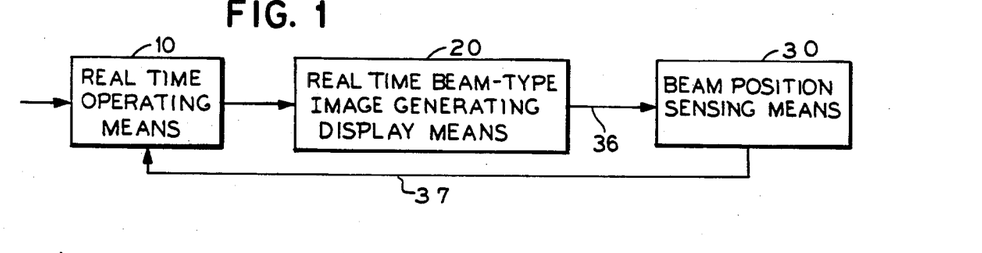
FIG. 1 is a block diagram for indicating the basic concept of certain preferred embodiments of the present invention.

FIG. 1 illustrates a system and method according to the present invention whereby scaling errors and/or drift in a real time display are automatically corrected with the use of a closed control loop. The diagram of FIG. 1 is more readily understood by reference to FIG. 2 which shows an aircraft head up display system in accordance with the basic concept of FIG. 1.

Figure 2:
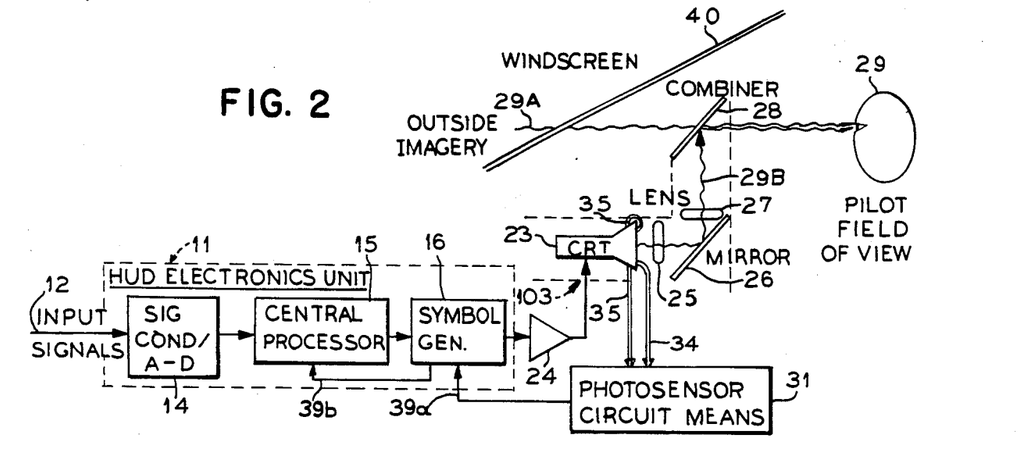
FIG. 2 is a diagrammatic view for indicating an aircraft head up display system as a preferred implementation of the block diagram of FIG. 1.

For the specific example of FIG. 2, real time operating means 10, FIG. 1, may comprise a HUD electronics unit 11 for supplying analog deflection command signals in accordance with input signals at 12 from the aircraft instrumentation. Exemplary input signals from the aircraft might include signals for defining the attitude (roll and pitch) and heading of the aircraft, altitude, speed, and other parameters useful to the pilot during takeoff, flight and landing of civil aircraft.

By way of example, these input signals may be in analog form and may require conversion and conditioning to a suitable format by means represented by block 14 in FIG. 2. The aircraft input signals may be filtered and stored by central processor 15 for use in controlling symbol generator component 16. The central processor 15 manages the entire operation of the HUD system. It controls the input signal conditioning, data storage and reads the pilot control panel 18, FIGS. 3 and 4, on the pilot display unit 19, which may correspond generally with block 20, FIG. 1. Based upon pilot selected modes and the nature of the input signal data, the central processor 15 manages the symbol generator 16. To do this it may compute the value, position, and orientation of each individual symbol to be displayed.

As a result of these solutions, the central processor 15 loads a memory with commands for generation of each required symbol. Sixty times per second this data block is transferred to the symbol generator to execute. In an exemplary embodiment, central processor component 15 is implemented utilizing a commercially available sixteen bit microprocessor.

The symbol generator 16 receives the block of data which defines the required symbols, their values, positions and orientations. It then generates sequential high speed waveforms used to drive cathode ray tube 23, so as to produce the defined symbols. To achieve this, it generates three separate signals simultaneously:

Vertical deflection
Horizontal deflection
Blanking (video)

Each symbol set is generated at a rate of fifty or sixty times per second. This is necessary to eliminate display flicker and to insure a good brightness level from the CRT phosphor screen.

Cathode ray tube symbol generation is performed in either of two general techniques:

raster
stroke

Raster generation uses a beam which continously sweeps successive horizontal lines until the entire screen has been traced. Imagery is formed by modulating the beam intensity as the raster pattern is traced. TV is a raster generated image.

Stroke generation controls both beam position and intensity in a writing pattern as dictated by the imagery to be generated. Stroke generation requires complex high speed deflection signals for both horizontal and vertical axes, in addition to synchronous beam intensity control. Oscilloscopes are driven using stroke techniques.

The cathode ray tube 23, FIG. 2, may be a small (2.375"×3" screen) unit which is driven in stroke, like an oscilloscope, rather than in raster like a TV. It emits a green image which has a very narrow spectral band. This is done to enable special filtering in the optics.

Stroke symbol generators typically require large amounts of high speed digital circuitry. Significant reduction in the requirement has been achieved in a preferred implementation wherein a second sixteen bit microcomputer with special software emulates conventional stroke symbol generator hardware. The output of the symbol generator consists of two high speed analog deflection signals scaled to drive the CRT deflection amplifiers and a blanking control. The analog amplifiers are represented by component 24 in FIG. 2.

Figure 3:
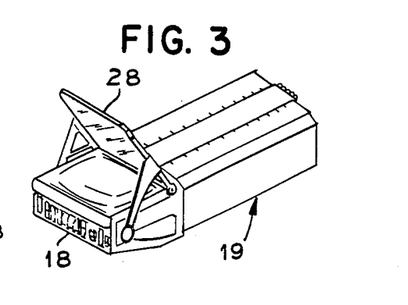
FIG. 3 is a diagrammatic perspective view showing the overall physical appearance of a pilot display unit for housing certain of the components of FIG. 2.

The cathode ray tube 23, located in the Pilot Display Unit 19, FIG. 3, is used to form the optical image. It receives signals from the symbol generator 16 which control beam position and intensity. The functions of the optics indicated at 25–28 in FIG. 2 are to:

Efficiently collect the imagery from the CRT screen.
Collimate (focus at infinity) the image.
Combine it with the real world image.
Project it into the pilot's field of regard at a 12–15 inch viewing distance and a 15° (height) by 30° (width) total field of view.
Provide optical correction to enable moderate head movement and binocular vision.
Insure adequate brightness/contrast to be seen against a luminous environment of 8,000–10,000 foot lamberts.

The optics unit will include:
CRT mounted inside its electromagnetic interference (EMI) shield and optically fixed relative to the optical path.
Image collector and corrector lenses indicated at 25 in front of the CRT.
A reflecting mirror 26 to direct the image upward to the combiner glass 28.
A collimating lens 27 to focus the image at infinity.
The combiner glass 28 used to both transmit the outside image represented at 29A, FIG. 2, and reflect the virtual image 29B to the pilot field of view 29. The combiner may be coated with a suitable filter to enhance contrast and aid symbol viewing in high brightness environment.

Component 30 in FIG. 1 is specifically represented by photosensor circuit means 31 in FIG. 2. For the sake of a specific example in FIG. 2, a fiber optic cable means indicated at 34 and 35 in FIG. 2, are shown as being aligned with specific locations on the screen of cathode ray tube 23. The beam position sensing means 30, FIG. 1, is shown as having a coupling 36 with display means 20 which may comprise an optical coupling as shown at 34 and 35 in FIG. 2, and as having a feedback connection 37 with real time operating means 10 so as to provide a closed loop control configuration. In the specific example of FIG. 2, the photosensor circuit means 31 is shown as being coupled with an interrupt input 39a of symbol generator component 16. The symbol generator 16 reports the beam position to the central processor 15 to complete the feedback path at 39b. The feedback connection at 39a, 39b in FIG. 2 (and at 39, FIG. 6) allows control of the CRT beam in a closed loop manner analogous to a servomechanism. The preferred closed loop control system enables precise beam positioning over the temperature range to which business and commercial aircraft are subjected for the useful life of the equipment, without ultra expensive analog design or frequent manual calibration. Precise beam positioning is required to facilitate registration of the synthetic symbols against the real world image.

An early closed loop control system as represented in FIG. 2 had four photodetectors coupled with four corners of the CRT screen, but presently only two beam position sensing locations at diametrically opposite corners are being used to correct for both scaling and drift errors. The detectors sense beam position during a special automatic calibration routine. As a result of this calibration, the system can determine bias and scaling drift within the system and automatically insert compensation in a closed loop manner.

The calibration routine is automatic, periodic and transparent to the pilot.

Figures 6, 7, 8:
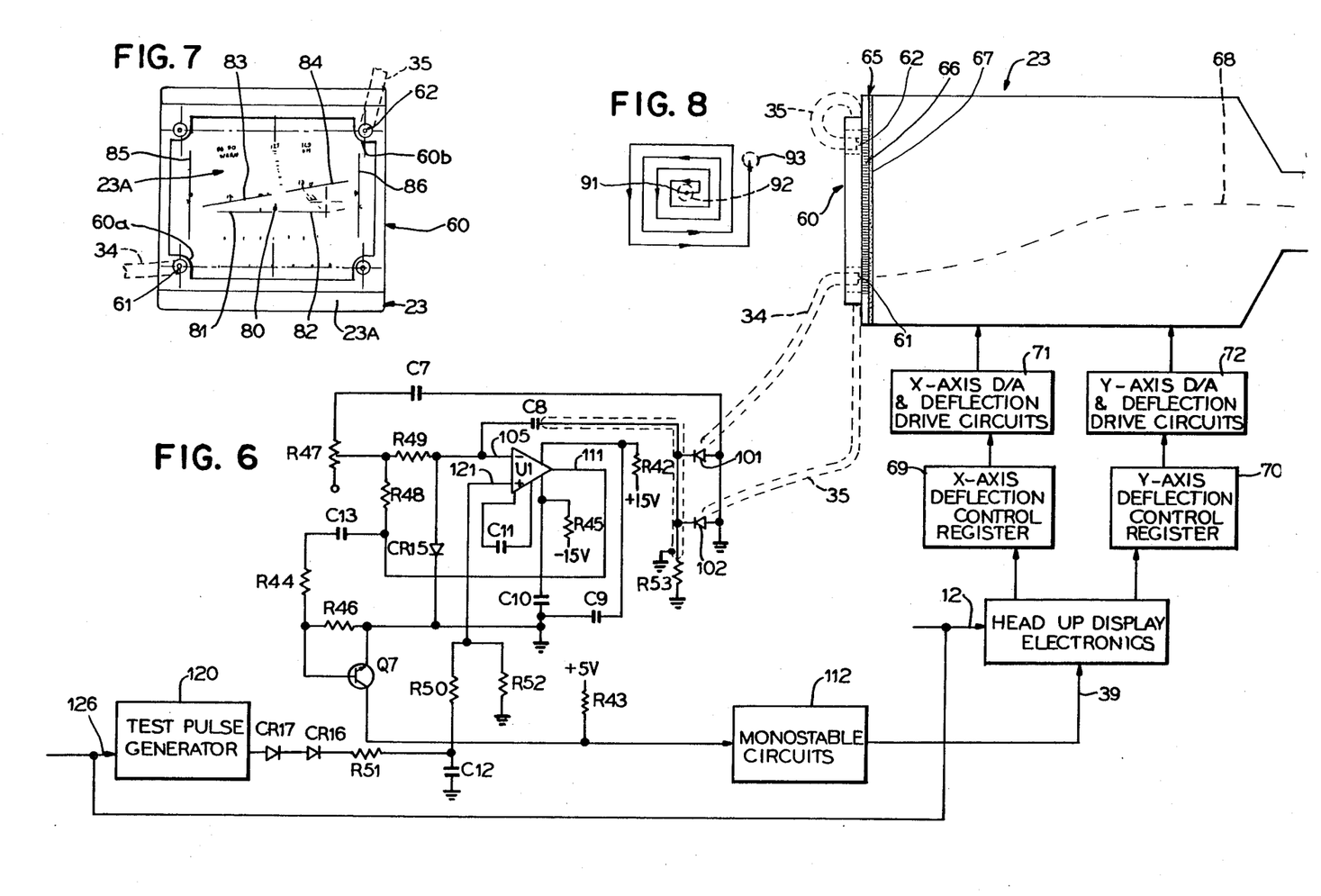
FIG. 6 shows exemplary details of a preferred implementation of the beam position sensing means of FIGS. 1 and 2.
FIG. 7 is a somewhat diagrammatic frontal view of the cathode ray tube faceplate (which is shown in FIG. 6 as it appears when looking toward a side edge thereof) and which faceplate frames an optical display for the closed loop HUD system of FIG. 2.
FIG. 8 is an enlarged diagrammatic view illustrating a portion of an exemplary beam search pattern which may be utilized to determine the actual beam positions corresponding to selected fixed locations such as the pinholes of the faceplate of FIG. 7 in the case of a stroke type symbol generator.

A detailed explanation of the processing of the beam position signals is given hereafter in conjunction with the description of FIGS. 6 to 8.

Figure 4:
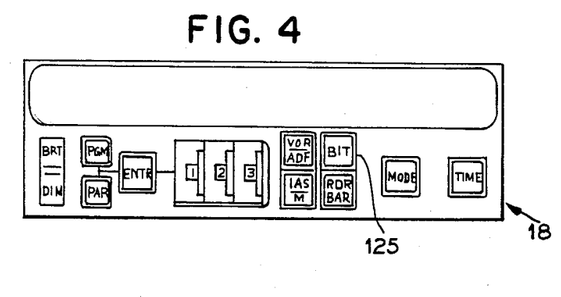
FIG. 4 is a diagrammatic frontal view showing an exemplary pilot control panel for the unit of FIG. 3.

An example of a pilot's control panel 18 is shown in FIG. 4.

Measured from the pilot's eye reference, the pilot display unit (PDU) structure 19, FIG. 3, may be contained within the angular sector between −13° and −25°. In addition, it should not penetrate the instrument panel structure in depth nor extend closer than twelve inches ahead of the pilot's eye reference. Laterally, the unit may be constrained by the compound curve of the windscreen.

In addition, the installation requires a highly rigid bore-sighted mounting. To accommodate this requirement, the PDU may be mounted in a fixed tray. The tray will adapt to the specific aircraft installation and be permanently boresighted. This arrangement will enable removal of the PDU for maintenance without re-boresighting. Hardware and software for electronic boresight alignment are provided in the system. It will also accommodate various type installations with a common model PDU. The Hud Electronics Unit 11, FIG. 2, can be installed remote from the PDU component 19 to allow for maximum installation flexibility.

Figure 5:
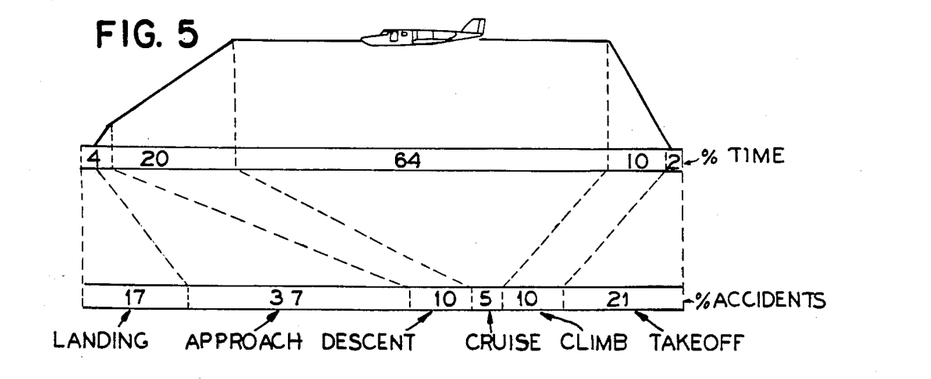
FIG. 5 shows a profile of the phases of aircraft flight with numerical scales for indicating the percentage of the time of an average flight occupied by the various phases, on the one hand, and for indicating the percentage of accidents which occur during the various phases, on the other hand.

FIG. 5 is included by way of background for emphasizing the utility of a HUD system for civil aircraft, particularly during the approach and landing phases of aircraft operation. FIG. 5 shows in a profile diagram where different percentages of aircraft accidents occur; specifically 21% are shown as occurring on takeoff and 54% during landing mode including approach and landing phases.

Closely associated with these accident statistics is the transition and accommodation burden placed upon the pilot. This is explained as follows, having reference to aircraft lacking a head up display.

Normally a pilot controls the flight of his aircraft using information from two widely different sources. One source is the visual information seen through the cockpit windscreen 40, FIG. 2. This "real world" information 29A is seen focused at infinity while looking "head up."

The second source of visual information (in the absence of a head up display) is represented on the flight instruments in a wide variety of formats. This instrument information is seen focused at 28–30 inches while looking "head down."

Neither information source is fully adequate to furnish the pilot's total data requirements in all phases of flight. Therefore, he must extract data from both sources which requires transitioning between "head up" and "head down."

This visual transition places many psychological and physiological burdens on the pilot. Physiological accommodation must be made for wide ranges of focal lengths, acuity and lighting levels. Psychological accommodation centers around the widely different formats in which information is made available between the real world scene and various cockpit instruments.

This visual transition and related accommodation situation are most critical during the landing phase.

The stringent demands on a real time display system such as a HUD system are particularly apparent when the landing mode of a high performance aircraft is considered. Specifically FIG. 5 illustrates on the "% Time" scale that approach and landing account for four percent of the elapsed time between takeoff and landing for an average flight. Referring to the "% Accidents" scale, the approach phase contributes 37% of the accidents, while landing phase is involved in 17% of the accidents.

DESCRIPTION OF FIGS. 6, 7 AND 8, AND EXPLANATION OF PROCESSING OF BEAM POSITION SIGNALS

In the specific embodiment of FIGS. 6, 7 and 8, a light emitting screen 65 of the cathode ray tube 23 may comrpise a fiberoptic light transmissive end wall 66 and a fluorescent layer 67. The end wall 66 is shown as having an opaque mask 60 covering the marginal region, and the faceplate 60 has pinholes 61 and 62 for transmitting light pulses when the electron beam 68 is instantaneously aligned therewith. In the programming of the electronics unit 11, FIG. 2, the points on the cathode ray tube screen aligned with pinholes 61 and 62 may be assigned reference coordinate values which may be designated as X1,Y1 and X2,Y2, respectively, for the case of a cartesian coordinate system where the variables X and Y represent horizontal and vertical beam deflection, respectively.

Where the beam deflection circuits of component 24, FIG. 2, are controlled by respective horizontal and vertical deflection registers of symbol generator 16, in the absence of any beam registration errors, loading the reference values X1 and Y1 in the horizontal and vertical deflection registers would cause deflection of the beam so as to be in alignment with pinhole 61, while loading of reference values X2 and Y2 would align the beam with pinhole 62. Such horizontal and vertical deflection command registers have been indicated at 69 and 70 in FIG. 6, and have been indicated as controlling respective digital to analog converters and analog driver circuits of components 71 and 72, FIG. 6.

In the case of a raster type display, the beam might be deflected in a horizontal direction (e.g. from left to right as viewed in FIG. 7) over positions corresponding to count values from zero to one thousand and twenty three in the horizontal deflection register. The range in the vertical direction (e.g. from top to bottom in FIG. 7), as an arbitrary example, might also correspond with count values from zero to one thousand and twenty three, (although then incremental vertical deflection for each count might be less than for the horizontal deflection). With such a range of count values, the reference coordinate values assigned to pinholes 61 and 62 might be RX1=183, RY1=183, and RX2=839, RY2=839. For this numerical example, with zero registration error, the beam would align with pinhole 61 when scanning along line number one hundred eight-three, (Y=183), and pinhole 62 would be activated during scanning of line number eight hundred thirty nine, (Y=839). The beam blanking control may then turn on the beam for successive lines in the vicinity of lines one hundred eighty three and eight hundred thirty nine, and for values of horizontal deflection approximately corresponding to the horizontal extent of mask regions 60a and 60b, so that such scanning does not appear in the pilot's field of view (indicated at 29 in FIG. 2).

As explained in reference to FIG. 2, the light pulses representing the instants of beam registration with pinholes 61 and 62 may be conducted by fiber optic cables 34 and 35 to photosensor circuit means 31, FIG. 2, which provides respective interrupt signals at input 39. In this way the actual coordinate values at beam coincidence, (designated AX1, AY1, and AX2, AY2) may be stored in central processor component 15, FIG. 2.

For the case of a symbol generator 16, FIG. 2, which operates on the stroke generating principle, individual symbology elements such as indicated 80-86 in FIG. 7, as well as the smaller symbols and alphanumeric elements are generated by respective sets of deflection command sequences in each successive frame. In this case, further command sequences can be introduced at suitable intervals for causing the beam to execute search patterns in the vicinity of pinholes 61 and 62. An example of such a search pattern, shown greatly enlarged, is given in FIG. 8.

In searching in the vicinity of pinhole 61, for example, the beam might be turned on at starting point 91, with deflection command values X=183, Y=183, in the initial instance, so that pinhole 61 would be activated at once for the case of zero registration error. The next search command as indicated in FIG. 8, would be X=184, Y=183, followed by X=184, Y=184, and so on. The search pattern would cover each point in the vicinity of pinholes 61 and 62. The size of the beam spot is indicated at 92 in FIG. 8, and the size of the pinholes 61 and 62 is indicated at 93. The relationship of the sizes is such that even when the beam center intersects a margin of the pinholes, sufficient light will be transmitted through the pinhole to actuate the photosensor circuit 31, FIG. 2. (A preferred photosensor circuit is shown in FIG. 6.)

For the example of FIG. 8, the pinhole 61 as represented by circle 93 would be discovered at coordinate values AX1=188, AY1=186, and these values would be stored by central processor component 15, FIG. 2. The search pattern such as shown in FIG. 8 would be of total extent such as to be reliably confined behind the mask portions 60a and 60b. The starting point 91 for each successive search pattern may be at the coordinates found in the immediately previous search. Thus the second search pattern in the vicinity of pinhole 61 would be initiated with deflection command values X=188, Y=186, and would progress through points X=189, Y=186; X=189, Y=187; X=188, Y=187; X=187, Y=187; and so on.

Since the result of activating the phosphor of the CRT screen is not the production of a theoretical geometrical point of light, but rather of a spot of given diameter, and also due to reflection, diffusion, and acceptance angle effects in the conveyance of the light between the CRT phosphor and the light detection apparatus, some ambiguity will ensue in determining the exact position of the beam. In order to eliminate this ambiguity, the search operation occurs in two phases; the coarse locating mode followed by the fine positioning determining mode.

The coarse locating mode simply scans the search pattern already described until a detection event occurs. This event indicates that the beam position causing the event is within the circle of ambiguity resulting from the above described causes.

The fine positioning mode is then executed, which enables the system to find the center of the circle of ambiguity. As a description of one possible technique which has been successfully implemented, two search scans are made in the horizontal (X) axis, one approaching the circle of ambiguity from the left, and the other approaching from the right. The X command values at each occurrence of the detection event are stored, and the difference between them is calculated and then divided by two. The resulting number is then added to the smaller value so as to yield a value representing the X position of a vertical line bisecting the circle of ambiguity, which line obviously passes through its center.

Now the circle of ambiguity is approached along the line just established, first from the top downward followed by an approach from the bottom upward, and the Y command values upon the detection event are determined and stored. A similar algebraic procedure then determines the halfway point between the Y intercepts of the circle of ambiguity, and the theoretical center has been determined. These values, in conjunction with those determined for the other detection location, are subsequently compared with the reference values and used for the calculation of the required corrections in offset and scaling.

The successive searches in the vicinity of pinholes 61 and 62 may take place at intervals such as to insure that the pinholes 61 and 62 will always fall within each successive search pattern.

The principles involved in determining gain and drift errors from the beam position measurements are similar for the horizontal and vertical deflection axes, and are explained as follows.

Let $\Delta X$ and $\Delta Y$ be the magnitudes of the corrections required to position the beam properly with reference to the horizontal and vertical axes at each respective sensing location. Then let $\Delta X1$ and $\Delta Y1$ relate to the required corrections for pinhole 61 and $\Delta X2$ and $\Delta Y2$ represent the corrections required for pinhole 62. As a sign convention, assume that a positive $\Delta X$ value refers to a required shifting of the beam to the right as viewed in FIGS. 7 and 8, and assume that a positive $\Delta Y$ value indicates a need to shift the beam upwardly. Thus, if $AX1=188$ and $AY1=186$, (corresponding to location 93, FIG. 8, for the case of pinhole 61 as previously described), then the correction $\Delta X1$ would be plus five ($AX1-RX1=188-183=+5$), and correction $\Delta Y1$ would be plus three ($AY1-RY1=186-183=+3$). To shift the beam reference position (RX1, RY1), e.g., at 92, FIG. 8, to the actual position of the pinhole (AX1, AY1), e.g., at 93, the beam is to be shifted five count increments to the right (the direction assigned positive polarity) and three counts increments upward (also assigned positive polarity).

If the position of pinhole 62 were sensed at a position $AX2=834$, $AY2=836$, then $\Delta X2$ would be minus five ($AX2-RX2=834-839=-5$), and $\Delta Y2$ would be minus three ($AY2-RY2=836-839=-3$), and the X- and Y- axis scaling errors would be plus ten [$\Delta X1-\Delta X2=+5-(5)=+10$] and plus six [$\Delta Y1-\Delta Y2=3-(-3)=+6$]. The polarity would indicate that X-axis gain and Y-axis gain were too high.

On the other hand, if pinhole 61 was offset from the reference position (RX1, RY1) so as to require corrections of $\Delta X1=+5$, $\Delta Y1=+3$ as before, but pinhole 62 was detected at the reference position and therefore required zero corrections (i.e., $\Delta X2=AX2-RX2=839-839=0$; and $\Delta Y2=AY2-RY2=839-839=0$), then the scaling errors would be reduced to plus five for the X-axis gain and plus three for the Y-axis gain, the polarity indicating that X-axis deflection gain and Y-axis deflection gain were again too high. Further, the lack of symmetry between the required X and Y axis corrections with respect to pinholes 61 and 62 would indicate a drift of the display image, i.e., a drift of the display image to the left and downward relative to a midpoint intermediate between pinholes 61 and 62.

The X-axis error logic may be summarized as shown in the following table:

| $\Delta X1$ | $\Delta X2$ | | |
|---|---|---|---|
| | − | 0 | + |
| + | High Gain | High Gain Left Drift | Left Drift |
| 0 | High Gain Right Drift | O.K. | Low Gain Left Drift |
| − | Right Drift | Low Gain Right Drift | Low Gain |

This type of error determination logic holds qualitatively for both axes. Quantitatively, difference values provide a means of precise error compensation. Although a variety of test beam search patterns could be employed, the expanding square shown in FIG. 8 is given as an example. In FIG. 8, generally point 91 may represent the last known deflection coordinates where the pinhole 61 or 62 was located during an immediately previous search, and location 93 may represent the pinhole location determined as a result of the illustrated search pattern which began at point 91. Generally, the closed loop control system establishes new deflection coordinates for each symbol generated so as to reduce gain and drift errors in the resultant image display and so as to minimize the deviation between the desired pinhole coordinate values (RX1, RY1; RX2, RY2) and the successive actually observed pinhole coordinate values (AX1, AY1; AX2, AY2).

Thus, if a drift to the left is found (e.g., as viewed in FIG. 8), the subsequent symbol generating commands can each be numerically corrected by adding an X-bias value such that the display image at 23A, FIG. 7, tends to resume its illustrated centered relationship, with symbol 80, for example, precisely aligned with the optical axis.

For the case where the horizontal gain is found to be excessive, symbols at the left of the display region 23A may have proportionate gain correcting values added thereto, so that such symbols tend to be adjusted proportionately in a rightward direction, while for symbols at the right of the display region, proportionate gain correcting values may be subtracted to tend to shift such symbols proportionately in a leftward direction. A similar situation will exist for vertical axis gain and drift corrections such that the control loop tends to maintain the image display precisely centered relative to the optical system, and with constant gain on both axes. As a result, displayed lines 83, 84, FIG. 7, may be adjusted to maintain slopes accurately conforming to hat of the earth's horizon, for example, relative to the roll condition of the aircraft as represented by lines 81, 82, for example, in spite of different degrees of variation in X-axis and Y-axis gain during aircraft flight operations.

FIG. 6 shows a preferred circuit for implementing photosensor circuit means component 31 of FIG. 2. In this embodiment the light pulses produced at pinholes 61 and 62 are detected by PIN (Positive-Intrinsic-Negative) diodes 101 and 102, which are optically coupled with the pinholes by means of fiberoptic cables 34 and 35. The diodes 101 and 102 are mounted on a printed circuit board remote from the cathode ray tube 23, and outside of the electromagnetic interference shield 103 as indicated in FIG. 2. Thus the diodes 101 and 102 are essentially outside the influence of the AC electrostatic field of the cathode ray tube which is many orders of magnitude greater than the signal output from diodes 101 and 102.

The original design incorporated four location sensing, and there were four PIN diodes and four fiberoptic cables coupled with the pinholes at the four corners of faceplate 60. Although theoretically, a two location sensing system cannot detect gain variations along an axis normal to a line joining the two sensing locations, in practice such a variation will not occur. Thus, it is preferred to utilize only two pinholes at diagonally opposite corners of the faceplate 60, with only two fiberoptic cables and two diodes; however, the present disclosure specifically comprehends the use of all four pinholes of faceplate 60, with two further PIN diodes connected in parallel with diodes 101 and 102, and two further fiberoptic cables arranged similarly to cables 34 and 35. Thus the coupling indicated at 36 in FIG. 1 may represent four optical paths for transmitting actual beam position signals between components 20 and 30, as another example.

Because the central processor component 15 stores the X and Y deflection values representing the actual beam locations of the first and second pinholes 61 and 62 during the execution of respective first and second search patterns which occur at different times, a common sensing circuit can be used for sensing activation of both diodes 101 and 102. (In principle, a single diode could be used.)

The PIN diode structure is such that the P and N layers are separated by a very thin layer of pure silicon, which is a nonconductor. A PIN diode will not show conduction in either direction in the absence of activation by light energy. When light strikes the junction, the photons induce "tunneling", and the diode puts out a very low current in the order of microamperes, but with very fast risetime in the order of nanoseconds.

The actual beam position signals from diodes 101 and 102 are supplied via capacitor C8 to the inverting input 105 of an operational amplifier U1. Amplifier U1 is a high speed hybrid device (LH0032). It is configured in the detector circuit to have unity gain for DC and near open-loop gain for short risetime signals. This circuit is unstable in the presence of AC input signals, but this behavior is of no consequence in this application. Unity gain DC feedback occurs through T-network R47/R48/R49. C7 in the ground branch of the T-network allows the network to act only for AC or pulse signals; for DC only R48 and R49 are active. Potentiometer R47 adjusts the AC gain, normally set as close to maximum as possible without encountering no-signal instability.

When light from the CRT strikes a PIN diode, a current pulse is injected into the inverting input 105 of U1 through coupling capacitor C8. This pulse causes the high gain amplifier to temporarily become unstable, and a burst of noise and ringing appears at the output 111. This signal is coupled to the base of Q7 through network C13/R44 and causes Q7 to produce a burst of short negative-going pulses at its collector. This signal is sent to a monostable circuits component 112 where it is converted into a precisely timed pulse for transmission to the central processor interrupt line 39 as indicated in FIG. 2.

A test pulse generator component 120 is coupled to U1 non-inverting input 121 by a network CR17, CR16, R51, C12, R50, and R52. This applies a DC step of approximately 3.0 VDC to input 121. The effects of this step input, in the short term, on the amplifier U1 are indistinguishable from a PIN diode input, and an output occurs which triggers the monostable circuits component 112. An output from the component 112 in this case may represent a confirming signal signifying a valid test of amplifier U1. For example, the test may be initiated by a key 125, FIG. 4, which serves to advise the central processor 15, FIG. 2, of the test and which actuates the test pulse generator 120 via its input 126.

If the test key 125, FIG. 4, is held continously actuated to authorize a diagnostic/programming mode of the central processor 15, the interrupt at input 39 may be removed by means of the T-network already described, which provides unity gain DC feedback, and CR15. If CR15 were not in the circuit, eventually the T-network would raise the voltage at the inverting input 105 to equal the 3.0 VDC test level at input 121, at which time photosensor circuit would resume normal operation, disregarding the DC bias level due to the test signal. However, when 0.7 VDC is reached on the inverting input 105, CR15 clamps it at that level, and the amplifier U1 remains "hard over" with its output saturated positive, inhibiting any further response which could produce output by Q7. When the test key 125 is released, voltages in the photosensor circuit return to normal, and the circuit is ready to detect light pulses from pinholes 61 and 62.

During normal operation, the monostable circuits component 112, once actuated by a light pulse from pinhole 61, will prevent any further response to the signal from amplifier output 111 for a time interval sufficient for the symbol generator 16 to respond to the interrupt at 39, and to command the beam away from the vicinity of the pinhole 61, allowing amplifier U1 to restabilize before the search pattern in the vicinity of pinhole 62 is initiated. A symbol generating frame of 16.667 milliseconds may intervene between a search pattern in the vicinity of pinhole 61, and a search pattern in the vicinity of pinhole 62.

Exemplary Parameters for FIGS. 6 and 7

Electrical Parameters (FIG. 6)
U1, Ultra fast FET Operational Amplifier
Q7, Jantx type 2N2222A Resistance Values R42, ten ohms; R43, 1.0 kilohm;
R44, 1.0 kilohm; R45 ten ohms; R46, 1.0 kilohm;
R47, ten kilohm (adjustable);
R48, 1.0 megohm;
R49, ten kilohms; R50, 1.0 kilohm;
R51, 1.0 kilohm;
R52, ten kilohms; R53, ten kilohms Capacitance Values (Microfarads unless otherwise specified)

C7, 3.0 (fifty volts); C8, 3.0 (fifty volts); C9, 1.0 (fifty volts);
C10, 1.0 (fifty volts);
C11, ten picofarads (two hundred volts);
C12, 0.1 (fifty volts); C13, 0.1 (fifty volts)

Additional Electrical Parameters for FIG. 6.

Diodes

Unless otherwise specified, all diodes are type JANTX IN4148.

Capacitors

Unless otherwise specified, all capacitance values are in microfarads, (plus or minus ten percent).

Resistors

Unless otherewise specified, all resistance values are in ohms (¼ watt, plus or minus five percent).

Transistors

Unless otherwise specified, all transistors are 2N 5401.

Other Components

| Designation | Type |
|---|---|
| U1 | LH0032 |

Faceplate 60 FIGS. 6 and 7 (Dimensions in inches)

Length, 3.3; width 2.75; thickness 0.250; horizontal separation between pinholes 61 and 62, 2.70; vertical separation between pinholes 61 and 62, 2.0; radius of curved margins of sections 60a and 60b (measured from pinhole center), 0.150. Pinhole diameters, 0.010; pinhole depth 0.030; diameter of receiving holes for cables 34 and 35, 0.185, depth of receiving holes, 0.220.

Beam Deflection

By way of example, horizontal and vertical beam deflection values of zero volts DC may (in the absence of drift error) position the beam at the center of faceplate 60. A maximum horizontal deflection of the beam of minus fifteen angular degrees may deflect the beam to the left a distance of 1.43 or, 0.08 inch to the left of the center of pinhole 61. A maximum vertical deflection of the beam in the downward direction may be about 1.08 from beam center position or about 0.08 inch below the center of pinhole 61. The deflection to the right and upward may be symmetrical in relation to deflection to the left and downard, and utilize deflection voltages of opposite polarity. (The beam center position may be assigned horizontal and vertical deflection command values of $200_{16}$ or decimal 512.)

The generation of two search patterns such as that indicated in FIG. 8 may take place in much less than twenty milliseconds and much less than 16.667 milliseconds. As shown, each search pattern may cover many more than twenty points in the vicinity of a pinhole.

Material of Faceplate

Aluminum (flat black anodized after machining)

Programming Example

An exemplary procedure for calculating the scale and drift correcting factors is set forth on the following pages. As will be apparent to those skilled in the art, the calculated scale factors XSF and YSF for the X and Y axes could be supplied to digital to analog converters for controlling the gain of X-axis and Y-axis deflection amplifiers, and the calculated values of XBIAS and YBIAS or AYBIAS could be directly inserted into the X-axis and Y-axis deflection amplifier inputs to maintain the center of the displayed image at a desired central optical axis. For the sake of a preferred example, however, the values of XSF and YSF may be used to proportionately adjust the positions of the symbology by modifying the successive X and Y axis deflection commands in digital form so as to maintain a selected scale. Similarly, values of XBIAS and YBIAS or AYBIAS may be inserted into each deflection command as a digital correction, so that the complete displayed image maintains a desired centered relationship.

```
                                    ;
                                    ;       CLMPCALC - Clamp correction factor calculations
                                    ;
0002CA              CLMPCALC:
0002CA 48E7 1F00                    moveml    #0x1F00, a7@-        ; Push D3-D7
0002CE 51C3                         sf        d3                   ; Clear a reg for a test flag
0002D0 4CB9 000F0 0000              movemw    X2,#0x00F0           ; D4 = X2, D5 = Y1, D7 = Y2
       283C
0002D8 48B9 00F0 0000                movemw   #0x00F0, CLMPX2      ; Store data for recording
       0000
                                    ;
                                    ;       Calculate X scale factor = (X1-X2)/SFDIFF
                                    ;
0002E0 3005                         movw      d5, d0               ; Load X1
0002E2 9044                         subw      d4, d0               ; X1-X2
0002E4 C0FC 0064                    mulu      #100,d0              ; Scale by 100
0002E8 80FC 0A40                    divu      #SFDIFF, d0          ; D0 = (X1-X2)/SFDIFF = XSF
0002EC 0C40 0064                    cmpw      #100, d0             ; Check against 100% limit
0002F0 6F04                         jle       STOREXSF             ; Branch if within limits
0002F2 7064                         moveq     #100, d0             ; Otw, limit XSF to 100%
0002F4 50C3                         st        d3                   ; Remember the failure
0002F6              STOREXSF:
0002F6 33C0 0000 2838               movw      d0, XSF              ; Store it
                                    ;
                                    ;       Calculate dots per degree for the X axis
                                    ;
0002FC 3200                         movw      d0, d1               ; Duplicate XSF in D1
0002FE C2FC 0088                    mulu      #DOTPDEG, d1         ; D1 = XDOTPDEG
000302 33C1 0000 2834               movw      d1, XDOTPDEG         ; Store it
                                    ;
                                    ;       Calculate X bias = X1 − XSF * BIASOFF (include the 15 deg offset)
                                    ;
000308 C2FC 000F                    mulu      #15, d1              ; 15 deg offset
00030C C0FC 0D1C                    mulu      #BIASOFF, d0         ; XSF * BIASOFF
000310 9280                         subl      d0, d1               ; D1 = 15 deg offset - nominal X1
```

-continued

| | | | | |
|---|---|---|---|---|
| 000312 83FC 0064 | | divs | #100, d1 | ; Remove scaling of 100 |
| 000316 D245 | | addw | d5, d1 | ; Add in actual X1 to get bias |
| 000318 33C1 0000 282E | | movw | d1, XBIAS | ; Store x bias |

;
; Calculate Y scale factor = (Y1-Y2)/SFDIFF
;

| | | | | |
|---|---|---|---|---|
| 00031E 3006 | | movw | d6, d0 | ; Load Y1 |
| 000320 9047 | | subw | d7, d0 | ; Y1-Y2 |
| 000322 C0FC 0064 | | mulu | #100, d0 | ; Scale by 100 |
| 000326 80FC 0A40 | | divu | #SFDIFF, d0 | ; D0 = (Y1-Y2/SFDIFF = YSF |
| 00032A 0C40 0064 | | cmpw | #100, d0 | ; Check against 100% limit |
| 00032E 6F04 | | jle | STOREYSF | ; Branch if within limits |
| 000330 7064 | | moveq | #100, d0 | ; Otw, limit YSF to 100% |
| 000332 50C3 | | st | d3 | ; Remember the failure |
| 000334 | STOREYSF: | | | |
| 000334 33C0 0000 283A | | movw | d0, YSF | ; Store it |

;
; Calculate dots per degree for the Y axis
;

| | | | | |
|---|---|---|---|---|
| 00033A 3200 | | movw | d0, d1 | ; Duplicate YSF in D1 |
| 00033C C2Fc 0088 | | mulu | #DOTPDEG, d1 | ; D1 = YDOTPDEG |
| 000340 33C1 0000 2836 | | movw | d1, YDOTPDEG | ; Store it |

;
; Calculate Y bias = Y1 − YSF * BIASOFF (include the boresight offset)
;

| | | | | |
|---|---|---|---|---|
| 000346 3401 | | movw | d1, d2 | ; Dup YDOTPDEG in D2 |
| 000348 C0FC 0D1C | | mulu | #BIASOFF, d0 | ; YSF * BIASOFF |
| 00034C C2FC 001F | | mulu | #DBLOFFST, d1 | ; Twice the boresight offset |
| 000350 E281 | | asrl | #1, d1 | ; Boresight offset |
| 000352 9280 | | subl | d0, d1 | ; D1 = boresight offset - nominal Y1 |
| 000354 83FC 0064 | | divs | #100, d1 | ; Remove scaling of 100 |
| 000358 D246 | | addw | d6, d1 | ; Add in actual Y1 to get bias |
| 00035A 33C1 0000 2830 | | movw | d1, YBIAS | ; Store Y bias |

;
; Calculate absolute Y bias = Y1 − YSF * BIASOFF (include the 15 deg offset)
;

| | | | | |
|---|---|---|---|---|
| 000360 C4FC 000F | | mulu | #15, d2 | ; 15 deg offset |
| 000364 9480 | | subl | d0, d2 | ; D2 = 15 deg offset - nominal Y1 |
| 000366 85FC 0064 | | divs | #100, d2 | ; Remove scaling of 100 |
| 00036A D446 | | addw | d6, d2 | ; Add in actual Y1 to get bias |
| 00036C 33C2 0000 2832 | | movw | d2, AYBIAS | ; Store absolute Y bias |

;
; Store the results of the scale factor test
;

| | | | | |
|---|---|---|---|---|
| 000372 4A03 | | tstb | d3 | ; Check the results |
| 000374 660C | | jne | CLMPFAIL | ; Branch if failed |
| 000376 3F3C 0008 | | movw | #8, a7@- | ; Else signal everything |
| 00037A 4EB9 0000 0000 | | jsr | SUBFAIL | ; is ok |
| 000380 600A | | jra | CLMPOK | |
| 000382 | CLMPFAIL: | | | |
| 000382 3F3C 0008 | | movw | #8, a7@- | ; Signal the |
| 000386 4EB9 0000 0000 | | jsr | ADDFAIL | ; failure |
| 00038C | CLMPOK: | | | |
| 00038C 4CDF 00F8 | | moveml | a7@+, #0x00F8 | ; Restore regs from stack |
| 000390 4E75 | | rts | | ; Return |

Examples of suitable constants for the foregoing listing are as follows based on the example where pinholes 61 and 62 have the reference command values RX1=183, RY1=183; and RX2=839, RY2=839, as previously explained.

SDIFF=RX2−RX1=RY2−RY1
SDIFF=839−183=656
DOTPDEG=1022/30 degrees =34.067 (since 511 is midway between 183 and 839, and also midway between zero and 1022).
BIASOFF=RX2=RY2
BIASOFF=839

Referring to the earlier notation, the scale factors XSF and YSF would be expressed as follows:

$$XSF = \frac{\Delta X2 - \Delta X1}{SFDIFF}$$

-continued $$YSF = \frac{\Delta Y2 - \Delta Y1}{SFDIFF}$$

An aircraft real time display system is also of utility for providing a display image for viewing by an aircrew member while looking out of an aircraft at a scene relating to refueling or other airborne operation.

It will be apparent that many further modifications and variations may be effected without departing from the scope of the teachings and concepts of the present invention.

I claim as my invention:

1. In a method for automatically maintaining a desired geometrical relationship between beam deflection commands and the location of a resultant image display on a beam activated display screen, said method comprising:

establishing reference beam deflection command values for representing respective beam position sensing locations within the range of deflection of the beam, supplying beam deflection commands causing the beam to trace a resultant image display, and while maintaining said image display also causing scanning of the beam in at least both X and Y directions in a search pattern about the respective beam position sensing locations to determine actual beam deflection and, thereafter modifying the commands in accordance with the so determined actual beam deflection so as to tend to maintain the desired geometrical relationship of the resultant image display.

2. In a method according to claim 1, with a display screen having a force field in the vicinity thereof which would tend to interfere with electronic sensing of the beam at the beam position sensing locations, said method including conducting light pulses produced at the display screen by impingement of the beam at the beam position sensing locations to remotely located photosensor means.

3. In a method according to claim 2, said method comprising supplying beam deflection commands maintaining the image display at a central region of the display screen, and conducting light pulses to the photosensor means from beam position sensing locations outside of the central region.

4. In a method according to claim 2, said method comprising conducting light pulses to the photosensor means from not more than four beam position sensing locations.

5. In a method according to claim, 2, said method comprising conducting light pulses to the photosensor means from only two beam position sensing locations.

6. In a method according to claim 1, said method comprising supplying beam deflection commands to cause scanning of the beam in the vicinity of the respective beam position sensing locations at least every thirty seconds.

7. In a method according to claim 1, said method comprising
supplying beam deflection commands causing the beam to trace not more than four search patterns in the vicinity of the respective beam position sensing locations.

8. A method of maintaining a selected scanning relationship between information to be displayed and the magnitudes of corresponding beam deflections over a beam activated display screen, said method comprising
(a) establishing a beam position determining location within the range of deflection of the beam,
(b) causing the beam to produce an image display on the display screen, and also causing the beam to scan at least in both X and Y directions the display screen in a search pattern about the beam position determining location contemporaneously with the production of the image display,
(c) determining the magnitude of deflection required to cause the beam to activate the beam position determining location, and
(d) correcting subsequent deflection command signals based on the sensed magnitude of step (c) so as to tend to establish a fixed scaling relationship between the information to be displayed and the resultant beam deflections.

9. A method according to claim 8, with said method comprising
causing the beam to produce an image display at a central region of the display screen and also causing the beam to scan the display screen at a margin region thereof, the beam position determining location being in such margin region of the display screen and being offset from the central region.

10. A method according to claim 8, with said method comprising
establishing respective individual beam position determining locations at diametrically opposite margin regions of the display screen,
causing the beam to scan the diametrically opposite margin regions,
determining the magnitudes of deflection required to cause the beam to activate the respective beam position determining locations, and
correcting the subsequent deflection command signals based on such determined magnitudes.

11. In a display system,
beam type image generating means having a light-emitting screen including a central display region and marginal regions radially offset from the central display region,
operating means controlling said image generating means to effect the generation of an optical image in said central display region,
detector means coupled with plural individual locations at respective marginal regions of the image generating means so as to detect both horizontal and vertical beam deflection errors, the beam when in general alignment with the respective individual locations causing the detector means to produce respective beam position signals,
said operating means comprising beam deflection driver means for effecting deflection of the beam both in the central display region and in the marginal regions, and comprising deflection control means coupled with said deflection driver means for effecting generation of an optical image in said central display region and for effecting scanning of the beam in at least both X and Y directions in a search pattern over said marginal regions so as to activate said detector means to generate the respective beam actual position signals,
said operating means correcting the deflection of the beam based on the values of driving signals applied to the beam deflection driver means which are required to cause the beam to activate the detector means so as to tend to maintain a constant geometrical relationship between the optical image of said light emitting screen.

12. In a display system according to claim 11, said operating means correcting the deflection of the beam based on a comparison of the values of driving signals required to cause the beam to activate individual locations at diametrically opposite sides of an undeflected position of the beam so as to tend to maintain a fixed relationship between an optical image and light-emitting screen.

13. In a display system according to claim 11, said operating means correcting the deflection of the beam based on a comparison of the values of driving signals required to activate respective locations which are substantially spatially separated with respect to a given coordinate system axis so as to tend to maintain a constant scale of the optical image with respect to such coordinate system axis.

14. In a display system according to claim 11, said operating means correcting the deflection of the beam based on a comparison of the values of driving signals required to cause the beam to impinge on individual locations at diametrically opposite sides of an undeflected position of the beam so as to tend to maintain a fixed relationship between a center of the optical image and a center of the light-emitting screen, and so as to tend to maintain a constant scale of the optical image.

15. In a display system according to claim 11, with said beam type image generating means producing a substantial force field in the vicinity of the light-emitting screen, and said detector means being located remote from said light-emitting screen and being optically coupled with respective individual locations at the light-emitting screen.

16. In a display system according to claim 15, said detector means having respective fiber optic cable means of substantial length coupling said detector means with the respective individual locations at the respective marginal regions of the light-emitting screen.

17. In a display system according to claim 16, said operating means comprising operational amplifier means having a given open circuit gain, and capacitive coupling means coupling said detector means with said operational amplifier means such that said operational amplifier means transmits a signal with substantially said open circuit gain when the detector means is activated by the beam.

18. In a display system according to claim 11, said detector means comprising not more than four PIN diodes.

19. In a display system according to claim 11, with said operating means comprising said operational amplifier means having first input means coupled with said detector means, and having second input means, and test pulse generator means connected with said second input means of said operational amplifier means for effecting a test activation of said operational amplifier means simulating the activation of said detector means.

20. In a display system according to claim 11, said operational amplifier means having means for maintaining said operational amplifier means unresponsive to activation of said detector means for so long as a test signal is supplied to said second input means.

21. In a method according to claim 1, the method further comprises scanning of the beam in the vicinity of said beam position sensing locations in a predetermined two dimension search pattern.

22. In a method according to claim 21, wherein said search pattern has a first substantially coarse mode pattern and a subsequent second substantially fine mode pattern.

23. In a method according to claim 21, wherein said search pattern has an outwardly spiralling square configuration.

24. In a method according to claim 1, said beam position sensing location has substantially a pinhole in a mask located at said beam position sensing location and adjacent said screen.

25. In a method according to claim 10, the method further comprises causing the beam to scan each of the diametrically opposite margin regions in a predetermined two dimensional search pattern.

26. In a method according to claim 25, wherein said search pattern has a first substantially coarse mode pattern and a subsequent second substantially fine mode pattern.

27. In a method according to claim 10, wherein said search pattern has an outwardly spiralling square configuration.

28. In a method according to claim 25, wherein said individual beam position determining locations have substantially pinholes in a mask located at said margin region and adjacent said screen.

29. In a display system according to claim 11, wherein scanning of the beam over said marginal region is according to a predetermined two dimensional search pattern.

30. In a display system according to claim 29, wherein said search pattern has an outwardly spiralling square configuration.

31. In a display system according to claim 29, wherein said search pattern has a first substantially coarse mode pattern and a subsequent substantially second fine mode pattern.

* * * * *